Oct. 25, 1927.  
E. C. F. SCHAEFER  
1,646,878  
MANURE SPREADER  
Filed April 14, 1926  
2 Sheets-Sheet 1

Inventor  
E.C.F.Schaefer,  
By Clarence A O'Brien  
Attorney

Oct. 25, 1927.
E. C. F. SCHAEFER
1,646,878
MANURE SPREADER
Filed April 14, 1926          2 Sheets-Sheet 2
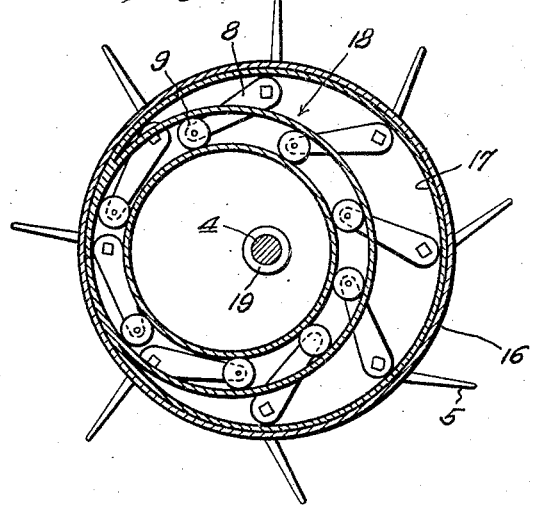
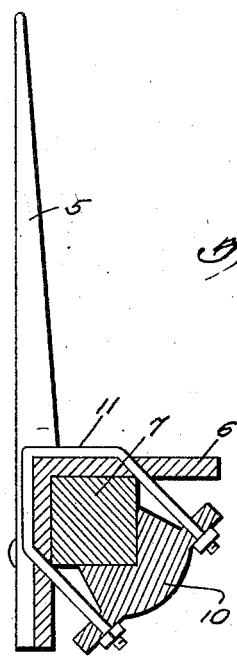
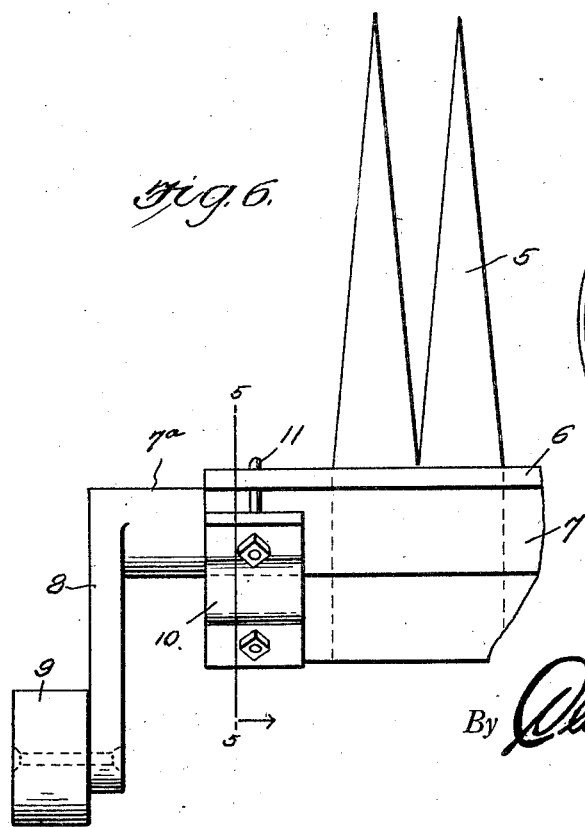
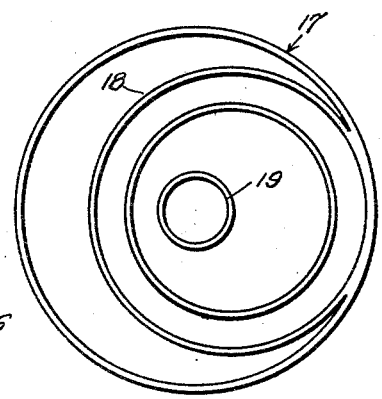
Inventor
E.C.F. Schaefer,
By *Clarence A. O'Brien*
Attorney Patented Oct. 25, 1927.

1,646,878

UNITED STATES PATENT OFFICE.

EDWARD C. F. SCHAEFER, OF YORK, PENNSYLVANIA.

MANURE SPREADER.

Application filed April 14, 1926. Serial No. 101,987.

This invention relates to an improved manure spreading device and it has reference to one which is used upon a wagon box or body at the rear end for raking and literally throwing the manure out and onto the ground.

The invention has more specific reference in one instance to a rotor which is rotatably at the rear end mounted of the wagon body, this rotor being equipped with teeth for gathering and lifting the material from an endless conveyor in the wagon body and then carrying it over and away from the rear end of the conveyor to dump it on the ground.

In order to appreciate the alleged novelty of the invention, it is to be borne in mind that in the ordinary manure spreader, there is an endless conveyor, the rear discharge end of which is placed inwardly from the discharge end of the body. In accordance with the present invention, an especially constructed rotor is located in this space and embodies stationary drums, flanged heads rotatable on said drums, tooth carrying bars, and crank arms operating in eccentric channels for producing an oscillatory movement of the teeth during the rotation of the head.

The gist of the present idea is in arranging the eccentricity of the eccentric channels in such a manner with respect to the axis of rotation of the head to cause the teeth to approach the conveyor at a desirable angle, to engage and lift the material from the conveyor, to carry it up and over the rotor and to readily and easily discharge it on the rearward and downward motion. In other words, the eccentricity of the channels is such that the teeth on the drum as they approach the lug from lower side are rearwardly inclined and gradually assume a radial position as they mount to the top of the drum, from which they gradually assume an inclined position.

Other features and advantages of the invention will become apparent from the following description and drawings.

In the accompanying drawings forming a part of this application, and in which like numerals are employed to designate like parts throughout the same:—

Figure 1:
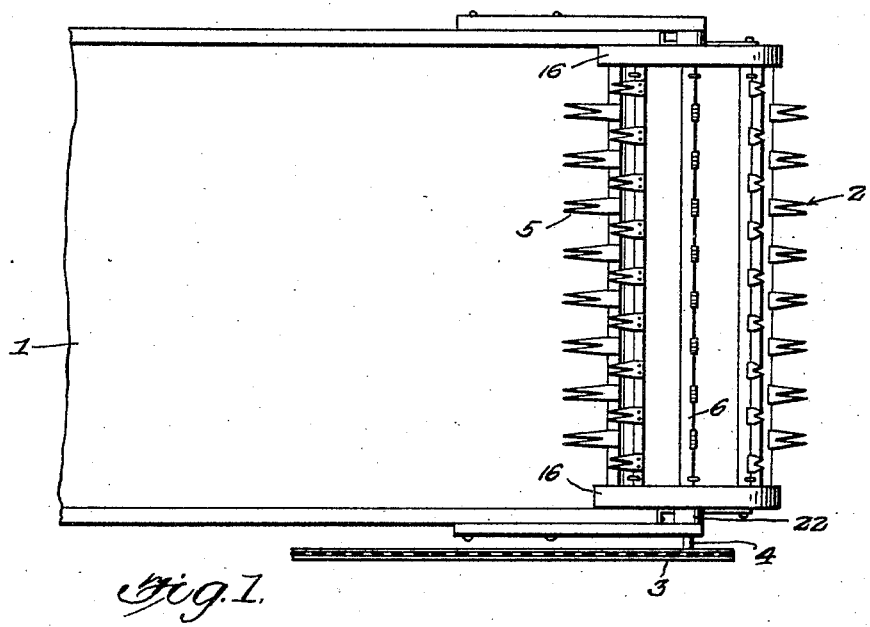
Figures 2, 3:
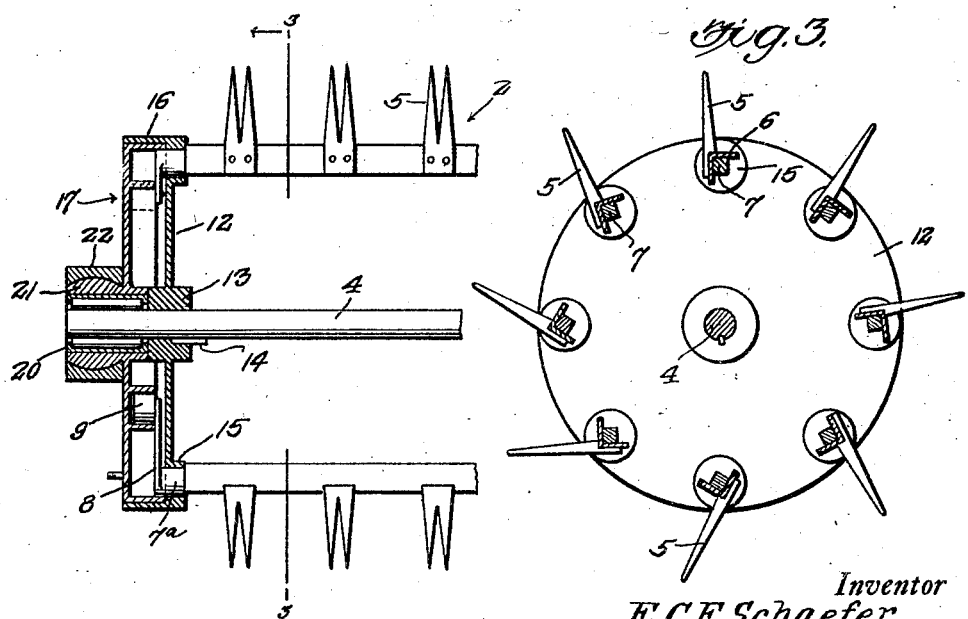

Figure 1 is a top plan view of a portion of a wagon body equipped with a manure spreader constructed in accordance with this invention, Fig. 2 is a fragmentary end view in section and elevation of the spreader, Fig. 3 is a cross section taken approximately upon the plane of the line 3—3 of Fig. 2, Fig. 4 is a section through one of the heads at the end of the rotor, Fig. 5 is a section taken on the line 5—5 of Fig. 6, Fig. 6 is an enlarged detail view of certain of the parts of the device, Fig. 7 is an end elevation of a drum forming a part of one of the end heads of the rotor.

Referring to Fig. 1, the reference character 1 designates a portion of a wagon body which is adapted to contain the usual manure conveyor (not shown). The distributing and scattering spreader is generally designated by the reference character 2, this being located at the rear open end of the wagon body. As before stated, the spreader is in the form of a rotor and is mounted for rotation in any suitable manner. This rotor is driven by a sprocket chain 3 trained over a sprocket on one end of an operating shaft 4. Incidentally the rotor travels in a direction from left to right in Fig. 4, it being understood that the upper flight of the conveyor (not shown), travels rearwardly or toward the direction of rotation of the rotor.

The rotor is made up chiefly of a central operating shaft 4 of cylindrical form (see Fig. 2). Spaced radially from this shaft are the circumferentially spaced rows of teeth 5. The teeth are mounted upon angle bars 6 and each angle bar is in turn mounted upon a crank rod bar 7 of substantially square cross section. As shown plainly in Fig. 6, the outer ends of the rods terminate in journals 7ª of cylindrical cross section. In addition, the ends of the rods are provided with right angularly disposed crank arms 8 carrying rollers 9. While considering Fig. 6, I would direct attention to the fact that a clamping plate 10 and straps 11 are employed for the purpose of maintaining the angle bar upon the crank rod.

Considering now the construction of the heads at the ends of the rods, I would state that each head (see Figs. 2 and 4) comprises a disk 12 which is formed at its center with a hub 13 keyed at 14 to the shaft 4. Adjacent its periphery, this disk is provided with bearings 15 to accommodate the aforesaid journals 7ª. In addition, it is formed with a peripheral flange 16 and this flange is rotatably mounted upon a relatively stationary drum indicated generally by the reference character 17. This drum is rigidly fastened upon the wagon body.

At this time, I would direct attention to Fig. 7 wherein it will be seen that the drum is provided on its inner face with an eccentrically disposed channel 18 in which the aforesaid rollers 9 are mounted for rotation. In addition the drum is provided with a central hub 19, a portion of which serves to accommodate a roller bearing 20 for the adjacent end portion of the shaft 4. It will be noticed that the outer end of this hub is constructed to provide a convex enlargement 21 turnable in a bearing 22 of corresponding construction. I might state here that the purpose of the bearing constructed by the parts 21 and 22 is to allow the drum 17 to be turned in order to dispose the eccentric channel 18 at the proper point at the time of installing the device upon the wagon body or manure spreader. The bearing becomes substantially ineffective after the drum is permanently fastened.

With this arrangement, however, it is obvious that the part 16 comprising the disk 12 and the flange 16 rotates about the periphery of the fixed drum.

From the foregoing, it will be seen that I produced a rotary element provided with a plurality of rows of raking and scattering teeth. Each row is rockably mounted upon the end head. It follows that during the revolution of the rotor, the teeth oscillate or rock. More specifically describing the operation, it will be seen that as the shaft 4 is rotated by appropriate means, the bar 7 and teeth carrying means 6 will rotate therewith. In addition, the disks 12 and flanges 16 will rotate about the drums. As each fixed drum is provided with an eccentric channel and as the crank arms have the rollers located in the channel, it is obvious that when the teeth get around near the bottom of the spreader, the travel of the rollers in the channel will serve to actuate the teeth in a manner to forcibly eject and scatter the manure from the spreader.

It is believed that by considering the description in connection with the drawings, persons familiar with inventions of this class will be able to obtain a clear understanding of the same. Therefore a more lengthy description is thought unnecessary.

While the preferred embodiment of the invention has been shown and described in detail, it is to be understood that minor changes coming within the field of invention claimed may be resorted to if desired.

Having thus described my invention, what I claim as new is:—

In a manure spreader of the class described, an elevating and ejecting rotor, embodying a pair of end heads in the form of disks provided with angularly disposed peripheral flanges, a shaft upon which the heads are keyed, a plurality of bars arranged at circumferentially spaced points and located between the peripheral portions of said heads, said bars being provided at their opposite ends with journals, and said heads being provided with bearings in which said journals are rotated, teeth carried by said bars, crank arms on the ends of said bars, a pair of hollow drum structures including peripheral rims, said flanges being stationary and fitting telescopically into said rims, said crank arms being located between said heads and drums, said drums being provided with endless eccentric channels, and rollers carried by the ends of said crank arms and movable in said channels, the aforesaid rotor being adapted to be mounted in the body of a manure spreader for forward rotation at the discharge end of said body, the eccentricity of said channel being such that the teeth on the drum as they approach the load from the lower side are rearwardly inclined and gradually assume a radial position as they mount to the top of the drum, from which they gradually assume an inclined position.

In testimony whereof I affix my signature.

EDWARD C. F. SCHAEFER.